May 2, 1967
W. R. CLENDINNING
3,317,356
PROCESS FOR APPLYING A PROTECTIVE COAT OF SILICON
CARBIDE TO REFRACTORY METALS
Filed March 31, 1964
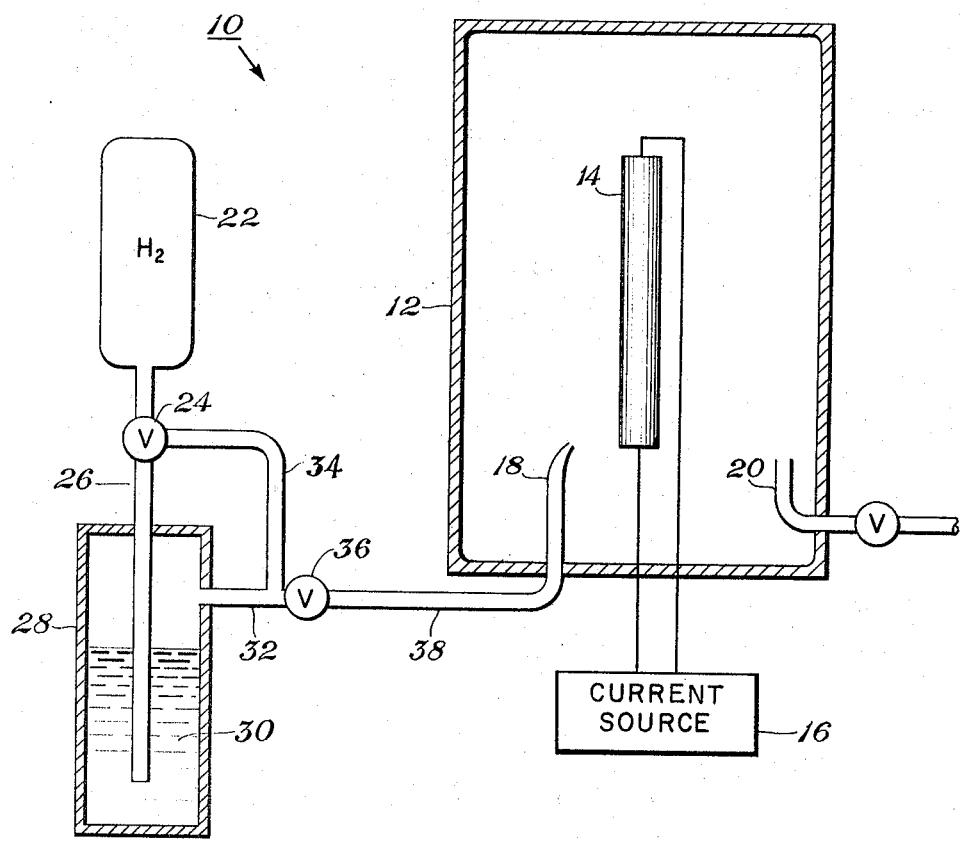
INVENTOR.
William R. Clendinning
BY
E. Mickey Hubbard
Attorney 3,317,356
PROCESS FOR APPLYING A PROTECTIVE COAT OF SILICON CARBIDE TO REFRACTORY METALS
William R. Clendinning, Dallas, Tex., assignor to Texas Instruments Incorporated, Dallas, Tex., a corporation of Delaware
Filed Mar. 31, 1964, Ser. No. 356,190
20 Claims. (Cl. 148—13.1)

The present invention relates to the protection of refractory metals from corrosion and gas permeation at high temperatures, and more particularly, but not by way of limitation, relates to a process for adherently depositing a dense, substantially fluid-impervious protective coating of silicon carbide on the surface of refractory metals.

Metals which maintain strength or structural integrity at high temperatures are commonly referred to as refractory metals. However, refractory metals are subject to rapid corrosion, particularly oxidation, at high temperatures. This fact materially limits the use of refractory metals at high temperatures except in situations where the atmosphere around the metal can be controlled. For example, fossil-fuel-fired thermionic diodes have not heretofore been practical because the refractory metals most suited for the thermionic emitter surfaces are subject to very rapid oxidation when placed directly in the flame. Further, the refractory metals are subject to hydrogen permeation at these high temperatures which is detrimental to the emitter of a thermionic diode.

On the other hand, silicon carbide can be vapor-deposited by a process described herein to form a dense, impermeable coating that is highly resistant to oxidation at temperatures up to about 1500° C., has a very low hydrogen permeation rate, and is stable under extreme temperature cycling. However, attempts to adherently apply these silicon carbide coatings to refractory metals were heretofore unsuccesful because the silicon carbide spalled off as the metal cooled. While the present invention is in no way limited to the correctness of the following theory, it is believed that this difficulty results from a metal silicide formed on the surface of the metal during the initial stages of the silicon carbide deposition process. During the initial stages of the process, free silicon atoms occur at the surface of the metal which tend to react with the metal to form silicides which are thermally unstable.

Therefore, an important object of the present invention is to provide a process for applying a coat of dense, substantially fluid-impervious silicon carbide to a refractory metal in such a manner that the silicon carbide will be adherently bonded to the metal, even after repeated temperature cycling, and thereby protect the metal from oxidation and gas permeation at elevated temperatures. In general, the process involves forming a thin protective film or other surface treatment on the surface of the refractory metal to prevent the formation of a metal silicide during the initial stages of the deposition of the coat of silicon carbide. The surface treatment may consist of coating the surface of the refractory metal with a protective thin film of a material which does not form a silicide, such as the metals bismuth, lead and thallium or compounds such as $Al_2O_3$, BN mechanically or otherwise deposited, or mechanically applied (e.g. spray deposited) silicon carbide.

However, the preferred surface treatment comprises carburizing the surface of the refractory metal. The process may be applied to substantially any refractory metal, either in bulk or vapor-deposited film form, and of substantially any shape. However, the process is particularly adapted for coating tungsten. The refractory metal may be carburized using any suitable well-known process such as, for example, by heating the metal in the presence of a carbon compound such as benzene or trichloroethylene, in which case hydrogen may be used as a carrier gas. The silicon carbide may then be deposited by heating the refractory metal within a controlled atmosphere system and passing a process stream using hydrogen as a carrier gas and containing vapors of a compound, such as methyltricholosilane, or other silicon and carbon bearing compounds. As the process stream is passed over the heated metal substrate, a thin quiesent zone results in the establishment of a high diffusion gradient which produces the rapid deposition of silicon carbide through a diffusion controlled, surface catalyzed reaction. As mentioned, the carburized surface film precludes the formation of a metal silicide and thereby permits only silicon carbide to be formed which securely bonds to the refractory metal. The silicon carbide is dense and substantially fluid-impervious, and by reason of this fact provides a barrier against oxidation and gas permeation of the refractory metal.

Therefore, an important object of the present invention is to provide a process for coating refractory metals with silicon carbide to protect the metals from corrosion, particularly oxidation, and from hydrogen and other gas permeation.

Yet another object of the present invention is to provide a process for adherently depositing a protective coat of silicon carbide on a refractory metal in such a manner that the silicon carbide will not spall off during repeated temperature cycling.

Another object of the present invention is to provide a process for adherently depositing dense, substantially fluid-impervious silicon carbide on tungsten.

Additional objects and advantages will be evident to those skilled in the art from the following detailed description and drawing, wherein:

The single figure is a schematic diagram of a system which can be used to practice the process of the present invention.

Referring now to the drawing, a system for carrying out the process of the present invention is indicated generally by the reference numeral 10. The system 10 is comprised of a reaction chamber 12 which may be of any suitable design and which may include appropriate closure means (not illustrated) for gaining access to the interior of the chamber. Some conventional means (not illustrated) is provided for supporting and heating a substrate 14. The substrate 14 may be resistively heated by an electric current from the source 16. It is to be understood, however, that the substrate may be heated inductively or by radiation. A suitable heat sensing means such as an optical pyrometer (not illustrated) may be used to monitor the temperature of the substrate and automatically control the heating current if desired.

A process stream is introduced to the chamber 12 through a nozzle 18 in such a manner that it forms a relatively thin quiescent zone for purposes which will presently be described. A conduit 20 is provided to withdraw the process stream from the chamber 12. A system for forming the process stream is comprised of a source of hydrogen gas 22 which is connected to a proportioning valve 24. The valve 24 divides the hydrogen stream in any desired proportion between conduits 26 and 34. The conduit 26 extends to a point below the liquid level of a container 28 so that the hydrogen will be bubbled through the liquid 30. A conduit 32 is connected to the container 28 above the liquid level and to the conduit 34 so that the two streams from the proportioning valve 24 are rejoined before passing through the control valve 36 and the conduit 38 which is connected to the nozzle 18. The proportioning valve 24 provides a means for controlling the concentration of vapor from the liquid 30 in the process stream. The valve 36 provides a means for controlling the volume of the process stream introduced to the chamber 12 through the nozzle 18.

As previously mentioned, in accordance with the broader aspects of the present invention, most refractory metals may be coated with silicon carbide by first pretreating the surface of the metal to prevent the formation of a metal silicide during the initial stages of the silicon carbide deposition process. In general, the term refractory metals would include any metal which would withstand the high temperatures required in the silicon carbide coating process, which are in excess of about 900° C. The process of the present invention is particularly adapted to coat tungsten and in situations where the coefficient of thermal expansion of a refractory metal is so different from that of silicon carbide as to limit the degree of temperature cycling which can be tolerated after the silicon carbide has been applied to the metal, the coating process may nevertheless be accomplished by first applying a film of tungsten to the refractory metal and then coating the tungsten film with silicon carbide.

In accordance wth the present invention, the surface of the refractory metal is first preconditioned by the application or formation of an intermediate film which, it is believed, prevents the formation of a thermally unstable metal silicide during the initial stages of the silicon carbide deposition process. Although the precise mechanism has not been absolutely confirmed, it is believed that the formation of the refractory metal silicide prevents the adherent bonding of the silicon carbide coat to the surface of the refractory metal, with the result that as the coated metal cools, the silicon carbide spalls off.

In accordance with a more specific aspect of this invention, the surface of the refractory metal is carburized prior to the application of the silicon carbide coating, and this specific aspect is particularly adapted for preconditioning the surface of tungsten. Any suitable method for carburizing the surface of the refractory metal may be employed. A number of such methods are set forth at page 288 in Materials and Techniques for Electron Tubes, by Walter H. Kohl, published by Reinhold. For example, a refractory metal substrate 14, such as tungsten, may be sandblasted to rough and clean the surface, then vapor de-greased with trichloroethylene. The substrate 14 is then transferred to the reaction chamber 12 using clean handling techniques and is connected to the current source 16 so that the substrate can be resistively heated. Of course, as previously mentioned, the substrate may be heated inductively or radiantly.

The chamber 12 is purged with an inert gas such as helium or argon, then the substrate heated to a temperature in the range from about 1200° C. to about 1900° C. A gas process stream comprised of hydrogen and the vapors of a carbon compound is then passed through the reaction chamber. The process stream may comprise, for example, from about 0.18 to about 1.0 grams of benzene or trichloroethylene per 10 liters of hydrogen. Or, methyl-cellulose binder or "Glyptal"-like material may be painted on the surface and substrate heated to temperature. The process stream may be formed by passing hydrogen from the source 22 through the proportioning valve 24, conduit 26, the liquid 30, which would be benzene or the carbon compound, and the conduit 32. The concentration of benzene in the hydrogen can be controlled by regulating the proportioning valve 24 so as to control the proportion of the hydrogen that is directed through the container 28 as compared to the proportion of hydrogen that is directed through the conduit 34. The valve 36 may be utilized to control the volume rate of flow to the chamber 12 which may be on the order of about 2 liters per minute.

The substrate should be maintained at the elevated temperature in the presence of the process stream for from about 0.5 minute to about 10 minutes, depending upon the temperature of the substrate. For example, if the temperature of the substrate is about 1200° C., the carburizing process may be carried out for from about 5 to about 10 minutes. A substrate temperature of about 1600° C. would require from about 1 to about 2 minutes. A temperature of 1900° C. will accomplish the necessary carburizing in about 0.5 minute.

Next the silicon carbide is deposited on the substrate by a suitable process such as that described in U.S. Patent No. 3,250,322. In this process, a gaseous stream containing hydrogen, silicon and carbon in appropriate ratios is introduced into the reaction zone in which the heated substrate is located. The carrier gas of the process stream is hydrogen and the flow conditions and geometry of the reaction zone are chosen with reference to the heated substrate such that the process stream flows about the heated substrate to form a minimum thickness quiescent zone through which a relatively high rate of diffusion occurs to produce the rapid co-deposition of silicon and carbon atoms onto the surface of the heated substrate. The proportion of atoms of silicon and carbon that are deposited can be controlled to yield a material which is substantially stoichiometric silicon carbide or may be silicon carbide having either carbon or silicon atoms as a second phase. The process provides a diffusion control, surface catalyzed reaction in which molecules or the reactants move across the thin quiescent zone existing adjacent the surface of the heated substrate by virtue of a relatively high diffusion gradient. The molecules, upon reaching the surface of the substrate, are decomposed to yield free silicon and carbon atoms which subsequently react to form a dense, substantially fluid-impervious coat of silicon carbide. In the reaction, hydrogen favors the formation of silicon atoms and this can be employed to conttrol the proportion of silicon and carbon atoms formed.

More specifically, methyltrichlorosilane may be used to supply both the silicon and carbon atoms in the hydrogen carrier gas. Thus after the surface of the refractory metal substrate 14 has been carburized, the substrate is reduced to a temperature in the range from about 900° C. to about 1500° C. After the substrate is uniformly heated to the desired temperature, some hydrogen from the pressure tank 22 is passed through the proportioning valve 24 and the conduit 26 into the container 28. The liquid 30 in the container 28 would now be methyltrichlorosilane. As the hydrogen is bubbled up through the liquid, methyltrichlorosilane vapors are entrained in the hydrogen, then passed through the conduit 32 and mixed with pure hydrogen bypassed through the conduit 34. The mixed process stream is then passed through the conduit 38 and introduced to the reaction chamber 12 through the nozzle 18. The mol ratio of the hydrogen to the methyltrichlorosilane should be from about 50:1 to about 4:1 and the mol ratios may be determined by a thermal conductivity cell (not illustrated). The flow rate of the process stream may be monitored by suitable flow meters and controlled by the valve 36.

The nozzle 18 should be positioned relative to the substrate 14 so as to insure that the quiescent zone adjacent the surface of the substrate is relatively thin and thereby produces a relatively high diffusion rate. The relatively high diffusion rate will cause the carbon and silicon atoms to be deposited on the surface at a sufficiently high rate to produce a dense bulk coat of beta silicon carbide which is essentially fluid-impervious, rather than large, fluid-pervious crystals which are produced by a deposition rate that is too slow. As the process is carried out, a substantially uniform coat of silicon carbide is formed over the entire surface of the refractory metal substrate by the mechanism previously explained in which the methyltrichlorosilane is decomposed to produce free atoms of silicon and carbon at the surface of the substrate by virtue of a diffusion controlled, surface catalyzed reaction.

In order to afford a better understanding of the silicon carbide coating, specific properties of silicon carbide coatings produced by the present process will now be presented. A relatively wide range of process variables including the mol ratios, process stream flow rate and therefore flow velocities, temperature of the substrate, and duration of the run will vary the thickness and physical and chemical properties of the silicon carbide coat within the following ranges. Runs have been conducted using hydrogen flow rates of 20 liters per minute to 100 liters per minute depending upon the system. Duration of the runs have been varied from 0.05 to 8.7 hours at temperatures from 1180° C. to 1450° C. Silicon carbide coatings having thicknesses from 3 to 115 mils have been produced. The silicon carbide coatings have beta crystalline structures, are very dense and, most important of all, are essentially fluid-impervious. The silicon carbide coatings may range from stoichiometrically pure silicon carbide to silicon carbide having as much as 0.89% free carbon or as much as 36.5% free silicon as a second phase element, depending upon the excess materials present and the amount. The compressive strength of the materials produced by the process ranges from about $31 \times 10^3$ to about $55 \times 10^3$ p.s.i. The modulus of elasticity ranges from about $45 \times 10^6$ to about $50 \times 10^6$ p.s.i. The coefficient of thermal expansion ranges from about $4.0 \times 10^{-6}$ to about $5.4 \times 10^{-6}$ to about $5.4 \times 10^{-6}$ in./in.° C. when tested in the temperature range of 30° C. to 810° C. The Knoop hardness of the material determined by utilizing a 1000 gram load ranges from about 988 to about 2900. The resistivity of the material ranges from 0.005 to about 4 ohm-centimeters. The density determined on a water displacement basis ranges from 2.59 to 3.28 grams per cc. No adverse thermal shock effects resulted when silicon carbide at 1000° C. was plunged into water at room temperature.

Although methyltrichlorosilane was specified in the above described example, various other materials can be employed to furnish the silicon and carbon. For example, the silicon-carbide source may be single compounds, such as dimethyldichlorosilane, trimethylchlorosilane, tetramethylsilane and other aliphatic and aromatic substituted halogenated silanes. Also, the silicon atoms and carbon atoms may be supplied in separate compounds. For example the carbon atoms may be supplied by compounds such as methane, ethane, propane, benzene, toluene, xylene, ethylene propylene, and other aliphatic and aromatic hydrocarbons, and the silicon atoms may be supplied by compounds, for example, such as silicon tetrachloride, silicon tetrabromide, silicon tetraiodide, or any one or more of mono-, di-, and tri- chloro-, bromo-, and iodo-silane.

The silicon-carbide-protected refractory metal is particularly well-suited for use as the emitter of a thermionic diode heated directly by a fossil-fuel-flame or by nuclear fuel because the silicon carbide serves as a corrosion and diffusion barrier to protect the metal. Of course, the silicon-carbide-protected refractory metal will have many other uses as diffusion barriers of and for corrosion protection in oxidizing atmosphere.

The permeation rates of helium and hydrogen through thin silicon carbide coating produced in accordance with the present invention were measured at 1300–1500° C. using a mass spectrometer for detection. Initial thicknesses of the sample tubes varied from 80–100 mils and the test sections were ground down to 10–30 mils in thickness. The samples were out-gassed in vacuum $$(10^{-5}\text{--}10^{-6} \text{ torr})$$

at temperatures up to 165° C. Because of high internal hydrogen backgrounds in the detector and in the vacuum system, deuterium was used as the test gas and measurements were made as H-D. Although the detectable limit for H-D was less than $3 \times 10^{-10}$ std.-cc./sec., the usable sensitivity was nearly always less due to background interference. Based on the pessimistic assumption that all of the H-D detected resulted from permeation, permeation rates of the order of $5 \times 10^{-9}$ atm.-cc.-mm./cm.$^2$-sec. were observed for hydrogen in silicon carbide at 1500° C. Similar rates were obtained for helium, again based on detector background levels.

Good agreement with literature values was obtained for H-D permeation through nickel at lower temperatures using the same techniques. The upper bound limit in silicon carbide compares favorably with similar limits of $2 \times 10^{-8}$ atm.-cc.-mm./cm.$^2$-sec. given for hydrogen permeation through high density alumina at 1250° C. For a typical diode of 50 cm.$^2$ hot area, the maximum in-leakage rates due to hydrogen permeation (1 atmosphere $H_2$ pressure) would be less than $1.8 \times 10^{-3}$ cc./hr. for a 30 mil barrier of silicon carbide.

Silicon carbide is also desirable for use as an oxidation or diffusion barrier because of its high thermal conductivity which is about 0.29 cal./cm.-sec. ° C. This, coupled with a very low thermal expansion coefficient of $4.5 \times 10^{-6}$ ° C. gives rise to excellent thermal shock resistance. Specimens of silicon carbide coating applied to ⅛″ tungsten rods were successfully cycled 45,000 times between 700° C. and 1450° C. without failure. The thermal cycling rates were of the order of 100° C./sec. on heatup and 200° C./sec. cool down.

Some diode configurations may require operation of the diode in an oxidizing atmosphere, or component failure may subject parts of the diode to corrosive atmospheres. The resistance of silicon carbide to oxidation in the temperature range 1100° C.–1400° C. is well-known.

Long term static oxidation tests were conducted to determine whether silicon carbide could be used as an oxidation barrier for the protection of refractory metals by direct application. The weight changes of pure silicon carbide and of silicon carbide on graphite were negligible for more than 2000 hours in air at 1300° C.–1400° C. Coatings of silicon carbide 20–30 mils thick on ⅛″ tungsten rods protected a number of samples in air at 1300° C. for more than 2000 hours. One sample was exposed for 4750 hours before failure occurred. The mean time to failure in the most recent test series was more than 750 hours. Specific examples of thermal cycle and lifetime tests will now be seen.

*Examle No. 1.*—A tungsten rod 7.0 inches long and 0.125 inch in diameter was carburized by applying a coat of lacquer to the rod and heating the rod to temperature preparatory to depositing silicon carbide. This resulted in a coat of tungsten carbide approximately 0.0007 inch thick. Then a coat of silicon carbide 0.027 inch thick was deposited on the surface of the rod using the process heretofore described. The coated rod was then cycled 15,000 times between room temperature and temperatures as high as 1,500° C. without failure.

*Example No. 2.*—A tungsten rod approximately 10 inches long and 0.125 inch in diameter was carburized by coating with Glyptal and heating in a vacuum at 1,400° C. for 4 minutes. A silicon carbide coat 0.014 inch thick was then deposited using the process heretofore described. The coated rod was cycled 47,884 times to temperatures as high as 1,450° C. before failure occurred due to oxidation of an uncoated end of the rod.

*Example No. 3.*—A tungsten rod approximately 10 inches long and 0.125 inch in diameter was carburized by applying a coat of lacquer and heating the rod to temperature in preparation for deposition of silicon carbide. Then a coat of silicon carbide 0.028 inch thick was applied using the above-described process. The coated rod was then placed in an air furnace and heated to 1,450° C. for 4,750 hours without failure. The test ended due to failure of the furnace.

*Example No. 4.*—A tungsten rod 10 inches long and 0.125 inch in diameter was carburized by coating with Glyptal and heating to 1,600° C. in a vacuum for 4 minutes. A coat of silicon carbide 0.009 inch thick was then applied using the process heretofore described. The coated rod was heated in air to 1,470° C. for 2,100 hours without failure.

Although specific embodiments of the present invention have been described in detail, it is to be understood that various changes, substitutions and alterations can be made therein without departing from the spirit and scope of the invention as defined by the appended claims.

What is claimed is:

1. A process for adherently depositing a protective coat of silicon carbide on the surface of a refractory metal comprising the steps of:
    carburizing the surface of the refractory metal, and
    depositing a coat of silicon carbide on the carburized surface.

2. A process for adherently depositing a protective coat of silicon carbide on the surface of tungsten comprising the steps of:
    carburizing the surface of the tungsten to produce a tungsten carbide film, and
    depositing a coat of silicon carbide on the carburized surface.

3. A process for adherently depositing a protective coat of silicon carbide on the surface of a refractory metal comprising the steps of:
    heating the refractory metal in the presence of carbon to carburize the surface of the metal, and
    heating the refractory metal in the presence of silicon and carbon to produce an adherent silicon carbide coat over the carburized surface of the metal.

4. A process for adherently depositing a protective coat of silicon carbide on the surface of tungsten comprising the steps of:
    heating the tungsten in the presence of carbon to carburize the surface of the metal, and
    heating the tungsten in the presence of silicon and carbon to produce an adherent silicon carbide coat over the carburized surface of the tungsten.

5. A process for adherently depositing a protective coat of silicon carbide on the surface of a refractory metal comprising the steps of:
    heating the refractory metal to a temperature in the range from about 1200° C. to about 1900° C. in the presence of a carbon compound to carburize the surface of the metal; and
    heating the refractory metal to a temperature in the range from about 900° C. to about 1500° C. in the presence of silicon and carbon to produce an adherent silicon carbide coat over the carburized surface of the metal.

6. A process as defined in claim 5 wherein the refractory metal is tungsten.

7. A process for adherently depositing a protective coat of silicon carbide on the surface of a refractory metal comprising the steps of:
    carburizing the surface of the refractory metal by heating the metal to a temperature in the range from about 1200° C. to about 1900° C. in an atmosphere of hydrogen and a carbon compound, and
    depositing a coat of silicon carbide on the carburized surface by heating the metal to a temperature in the range from about 900° C. to about 1500° C. and passing a process stream of hydrogen, silicon and carbon over the surface to produce a diffusion controlled, surface catalyzed reaction.

8. A process as defined in claim 7 wherein the refractory metal is tungsten.

9. A process as defined in claim 7 wherein the carbon compound is benzene.

10. A process as defined in claim 7 wherein the process stream is comprised of hydrogen and methyltrichlorosilane in the mol ratio of from about 50:1 to about 4:1 hydrogen to methyltrichlorosilane.

11. A process for adherently depositing a protective coat of silicon carbide on the surface of a refractory metal comprising the steps of:
    preconditioning the surface of the refractory metal to prevent the formation of a metal silicide during the initial stages of silicon carbide deposition, and
    depositing a coat of silicon carbide on the preconditioned surface.

12. A process as defined in claim 11 wherein the refractory metal is tungsten.

13. A process for adherently depositing a protective coat of silicon carbide on the surface of a refractory metal comprising the steps of:
    preconditioning the surface of the refractory metal to prevent the formation of a metal silicide during the initial stages of silicon carbide depositions, and
    depositing a coat of dense, substantially fluid-impervious silicon carbide on the preconditioned surface by heating the surface to a temperature in the range from about 900° C. to about 1500° C. and passing a process stream comprised of hydrogen, silicon and carbon over the surface to produce a relatively thin quiescent zone and high concentration gradient and a diffusion controlled, surfaced catalyzed reaction.

14. A process as defined in claim 13 wherein the refractory metal is tungsten.

15. A process as defined in claim 13 wherein the surface is preconditioned by carburizing the surface.

16. A process as defined in claim 11 wherein the refractory metal is molybdenum.

17. A process as defined in claim 11 wherein the refractory metal is tantalum.

18. A process as defined in claim 11 wherein the refractory metal is niobium.

19. A process for adherently depositing a protective coat of silicon carbide on a metal surface comprising the steps of:
    preconditioning the metal surface to prevent the formation of a metal silicide during the initial stages of silicon carbide deposition, and
    depositing a coat of silicon carbide on the preconditioned surface.

20. A process for adherently depositing a protective coat of silicon carbide on a metal surface comprising the steps of:
    forming a first intermediate protective layer on the metal surface, said first layer being formed of a material selected from the group consisting of bismuth, lead, thallium, aluminum oxide, boron nitride and sprayed silicon carbide, and
    depositing a coat of silicon carbide on said first protective layer.

References Cited by the Examiner

UNITED STATES PATENTS 2,458,655  1/1949  Sowa _____ 148—20.3
2,690,409  9/1954  Wainer _____ 148—20.3

DAVID L. RECK, Primary Examiner.

HYLAND BIZOT, Examiner.

R. O. DEAN, Assistant Examiner.